United States Patent
Chan et al.

(10) Patent No.: US 11,855,976 B2
(45) Date of Patent: Dec. 26, 2023

(54) UTILIZING BEHAVIORAL FEATURES TO AUTHENTICATE A USER ENTERING LOGIN CREDENTIALS

(71) Applicant: MASTERCARD TECHNOLOGIES CANADA ULC, Vancouver (CA)

(72) Inventors: Sik Suen Chan, Richmond (CA); Anton Laptiev, Vancouver (CA); Parin Prashant Shah, Vancouver (CA)

(73) Assignee: MASTERCARD TECHNOLOGIES CANADA ULC, Vancouver, CA (US)

( * ) Notice: Subject to any disclaimer, the term of this patent is extended or adjusted under 35 U.S.C. 154(b) by 71 days.

(21) Appl. No.: 16/988,172

(22) Filed: Aug. 7, 2020

(65) Prior Publication Data

US 2021/0044578 A1 Feb. 11, 2021

Related U.S. Application Data

(60) Provisional application No. 62/885,156, filed on Aug. 9, 2019.

(51) Int. Cl.
*H04L 29/00* (2006.01)
*H04L 9/40* (2022.01)
*H04L 67/306* (2022.01)

(52) U.S. Cl.
CPC .......... *H04L 63/0823* (2013.01); *H04L 63/04* (2013.01); *H04L 63/0861* (2013.01); *H04L 63/20* (2013.01); *H04L 67/306* (2013.01)

(58) Field of Classification Search
CPC . H04L 63/0823; H04L 63/04; H04L 63/0861; H04L 63/20; H04L 67/306;
(Continued)

(56) References Cited

U.S. PATENT DOCUMENTS 9,935,947 B1 * 4/2018 Machani ............. H04L 67/1002
2013/0054433 A1 2/2013 Giard et al.
(Continued)

FOREIGN PATENT DOCUMENTS

EP 3385875 A1 * 10/2018 ........... G06F 21/316
EP 3385875 A1 10/2018

OTHER PUBLICATIONS

International Search Report and Written Opinion for Application No. PCT/CA2020/051083 dated Nov. 13, 2020 (9 pages).
(Continued)

*Primary Examiner* — Jeffrey C Pwu
*Assistant Examiner* — Helai Salehi
(74) *Attorney, Agent, or Firm* — Michael Best & Friedrich LLP (57) ABSTRACT

A system for utilizing behavioral features to authenticate a user entering login credentials. The system includes an electronic processor configured to receive a request to access a user account and compare behavioral features included in the request to behavioral features included in a user behavior profile associated with the user account. The electronic processor is also configured to, based on the comparison, generate one or more scores. The electronic processor is further configured to, for each of the one or more scores, compare the score to a predetermined threshold and, based on the comparison of the score to the predetermined threshold, adjust a match value. The electronic processor is also configured to compare the match value to one or more predetermined thresholds to determine whether the behavioral features included in the request to access the user account authenticates the user, does not authenticate the user, or is inconclusive.

20 Claims, 4 Drawing Sheets

(58) Field of Classification Search
CPC . H04L 63/0876; H04L 63/102; H04L 63/107; H04L 63/108; H04L 9/3218; H04L 9/321; H04L 9/32; G06F 21/316; G06F 21/32; H04W 12/069; H04W 12/068; H04W 12/065; H04W 12/062; H04W 12/06
See application file for complete search history.

(56) References Cited

U.S. PATENT DOCUMENTS

| | | |
|---|---|---|
| 2013/0239191 A1 | 9/2013 | Bostick |
| 2015/0242605 A1* | 8/2015 | Du .................. G06F 21/32 |
| | | 726/7 |
| 2016/0261465 A1* | 9/2016 | Gupta .................. H04L 43/04 |
| 2017/0142118 A1* | 5/2017 | Androsov .......... G06F 21/6218 |
| 2019/0204907 A1* | 7/2019 | Xie .................. A63F 13/424 |
| 2019/0220583 A1 | 7/2019 | Douglas et al. |

OTHER PUBLICATIONS

Shi et al., "Implicit Authentication through Learning User Behavior," Proceedings of the 13th international conference on Information security, Jan. 2011, pp. 99-113.

Yang et al., "Dynamic Multi-level Privilege Control in Behavior-based Implicit Authentication Systems Leveraging Mobile Devices," arXiv:1808.00638, Aug. 2018, pp. 1-10.

Bailey et al., "User identification and authentication using multi-modal behavioral biometrics," Computers & Security, Jun. 2014, vol. 43, pp. 77-89.

European Patent Office. Extended European Search Report for application 20853311.7, dated Jul. 20, 2023 (9 pages).

\* cited by examiner

405 — RECEIVE A REQUEST TO ACCESS A USER ACCOUNT, THE REQUEST INCLUDING BEHAVIORAL FEATURES

410 — COMPARE THE BEHAVIORAL FEATURES INCLUDED IN THE REQUEST TO BEHAVIORAL FEATURES INCLUDED IN A USER BEHAVIOR PROFILE ASSOCIATED WITH THE USER ACCOUNT, THE BEHAVIORAL FEATURES INCLUDED IN THE USER BEHAVIOR PROFILE INCLUDES BEHAVIORAL FEATURES ASSOCIATED WITH ONE OR MORE PREVIOUS REQUESTS TO ACCESS THE USER ACCOUNT

415 — BASED ON THE COMPARISON, GENERATE ONE OR MORE SCORES INCLUDING AT LEAST ONE SELECTED FROM THE GROUP COMPRISING A RECENCY SCORE, A FREQUENCY SCORE, A NOVELTY SCORE, AND A TEMPORALITY SCORE

420 — FOR EACH OF THE ONE OR MORE SCORES, COMPARE THE SCORE TO A PREDETERMINED THRESHOLD AND, BASED ON THE COMPARISON OF THE SCORE TO THE PREDETERMINED THRESHOLD, ADJUST A MATCH VALUE

425 — COMPARE THE MATCH VALUE TO ONE OR MORE PREDETERMINED THRESHOLDS TO DETERMINE WHETHER THE BEHAVIORAL FEATURES INCLUDED IN THE REQUEST TO ACCESS THE USER ACCOUNT AUTHENTICATES THE USER, DOES NOT AUTHENTICATE THE USER, OR IS INCONCLUSIVE

UTILIZING BEHAVIORAL FEATURES TO AUTHENTICATE A USER ENTERING LOGIN CREDENTIALS

RELATED APPLICATIONS

This application claims priority to U.S. Provisional Patent Application No. 62/885,156, filed Aug. 9, 2019, the entire content of which is hereby incorporated by reference.

BACKGROUND

Currently, when users enter login credentials such as a username and password into, for example, a login form of a web-application, biometric data such as keystroke rate, number of mouse clicks, and the like are used to authenticate a user. A biometric data profile for a user may be established and associated with a user account (such as a mobile banking account) defined by the login credentials. This biometric data profile may contain information such as the typical keystroke rate, speed at which a cursor is moved, time elapsed between key up (release of a key) and key down (depression of a key) events, time spent entering a single login credential, time elapsed between entering successive login credentials, and number of mouse clicks per minute of the user. When the user subsequently enters the login credentials associated with the user account, biometric data associated with the action of entering the login credentials is collected. The collected biometric data is then compared to the biometric data profile associated with a user account. If the collected biometric information matches the biometric data profile (and other entered credentials are correct) a user is authenticated and logged into the user account associated with the entered logon credentials.

In some instances, when login credentials are entered into a login form, insufficient biometric data is available to be collected to be utilized to authenticate a user. In one example, an insufficient amount of biometric data for authenticating a user may be available to be collected when a user enters login credentials using an autofill function or a copy and paste function. In another example, an insufficient amount of biometric data for authenticating a user may be available to be collected when a hacker attempts to access the user account. In yet another example, an insufficient amount of biometric data for authenticating a user may be available to be collected when a user enters a small amount of data as login credentials (for example, when a user enters a 4-digit pin).

SUMMARY

The embodiments described herein provide a system for utilizing behavioral features to authenticate a user entering login credentials. Unlike biometric data, behavioral features are not collected based on how login credentials are entered to access a user account. Examples of behavioral features include a geolocation, an internet protocol (IP) address, a unique device identifier (UDID), a decentralized identifier (DID), a device fingerprint, a web browser, a user agent, a time stamp, an email domain, an internet service provider (ISP), an operating system version, a combination of the foregoing, and the like. Therefore, embodiments described herein provide for a more accurate mechanism for authenticating users in instances where biometric data collected during a login attempt is limited. It should be understood that, in some embodiments, biometric data may be used in combination with behavioral features to authenticate a user.

In the embodiments described herein, a user is authenticated by calculating a score based on behavioral data (a plurality of behavioral features) associated with a login attempt. The calculated score is compared to a threshold value to determine whether the login attempt is being made by the user associated with the user account or the login attempt is fraudulent. When it is determined that the login attempt is being made by the user associated with the user account, the user is authenticated. In this way, authentication can occur more readily for legitimate users while at the same time still preventing fraudulent users from accessing user accounts.

By providing a system for authenticating users using behavioral features in place of behavioral data, embodiments described herein enable users to be authenticated in a faster and more efficient manner when limited biometric data associated with a user's login attempt is available. For example, rather than requiring a user to refill in login credentials or provide additional information in order to collect additional biometric data when insufficient biometric data is collected during a login attempt, embodiments described herein utilize behavioral features to authenticate a user. Not having to re-enter credentials or enter additional credentials allows a user to access their account faster and with minimal effort, while using behavioral features to authenticate a user maintains the security of the users' account.

One embodiment provides an example system for utilizing behavioral features to authenticate a user entering login credentials. The system includes an electronic processor configured to receive a request to access a user account, the request including behavioral features and compare the behavioral features included in the request to behavioral features included in a user behavior profile associated with the user account. The behavioral features included in the user behavior profile include behavioral features associated with one or more previous requests to access the user account. The electronic processor is also configured to, based on the comparison, generate one or more scores including at least one selected from the group comprising a recency score, a frequency score, a novelty score, and a temporality score. The electronic processor is further configured to, for each of the one or more scores, compare the score to a predetermined threshold and, based on the comparison of the score to the predetermined threshold, adjust a match value. The electronic processor is also configured to compare the match value to one or more predetermined thresholds to determine whether the behavioral features included in the request to access the user account authenticates the user, does not authenticate the user, or is inconclusive.

Another embodiment provides an example method for utilizing behavioral features to authenticate a user entering login credentials. The method includes receiving a request to access a user account, the request including behavioral features and comparing the behavioral features included in the request to behavioral features included in a user behavior profile associated with the user account, the behavioral features included in a user behavior profile include behavioral features associated with one or more previous requests to access the user account. The method also includes, based on the comparison, generating one or more scores including at least one selected from the group comprising a recency score, a frequency score, a novelty score, and a temporality score. The method further includes, for each of the one or more scores, comparing the score to a predetermined threshold and based on the comparison of the score to the predetermined threshold, adjusting a match value. The method also includes comparing the match value to one or more predetermined thresholds to determine whether the behavioral features included in the request to access the user account authenticates the user, does not authenticate the user, or is inconclusive.

Yet another embodiment provides an example method non-transitory computer-readable medium with computer-executable instructions stored thereon that are executed by an electronic processor to perform a method of utilizing behavioral features to authenticate a user entering login credentials, comprising. The method includes receiving a request to access a user account, the request including behavioral features and comparing the behavioral features included in the request to behavioral features included in a user behavior profile associated with the user account, the behavioral features included in a user behavior profile include behavioral features associated with one or more previous requests to access the user account. The method also includes, based on the comparison, generating one or more scores including at least one selected from the group comprising a recency score, a frequency score, a novelty score, and a temporality score. The method further includes, for each of the one or more scores, comparing the score to a predetermined threshold and based on the comparison of the score to the predetermined threshold, adjusting a match value. The method also includes comparing the match value to one or more predetermined thresholds to determine whether the behavioral features included in the request to access the user account authenticates the user, does not authenticate the user, or is inconclusive.

DETAILED DESCRIPTION OF THE EMBODIMENTS

One or more embodiments are described and illustrated in the following description and accompanying drawings. These embodiments are not limited to the specific details provided herein and may be modified in various ways.

As described above, in some cases insufficient biometric data for authenticating a user may be collected when a user attempts to login to an account. In these cases, behavioral data may be used to authenticate a user in addition to or in place of biometric data. For example a user may attempt to access a bank account from their mobile phone by entering a username and password (login credentials) to a webpage displayed in a web browser on their mobile phone. However, a feature may be enabled in the web browser that allows the web browser to automatically enter the user's credentials when the webpage is displayed. When the username and password are automatically entered, little to no biometric data (for example, keystroke rate) may be collected. When little to no biometric data is collected, behavioral features such as the time of day that the user is attempting to access the account, the location of the mobile phone from which the user is attempting to access the user account, the device identifier of the mobile phone, and the like may be used to authenticate the user. For example, if the attempt to access the bank account is received on a Tuesday afternoon and the bank account is normally accessed on Tuesday afternoons, the mobile phone is in a city that is associated with the last ten requests to access the user account, and the device identifier of the mobile phone matches the device identifier associated with a plurality of successful attempts to access the account, the user may be authenticated.

Figure 1:
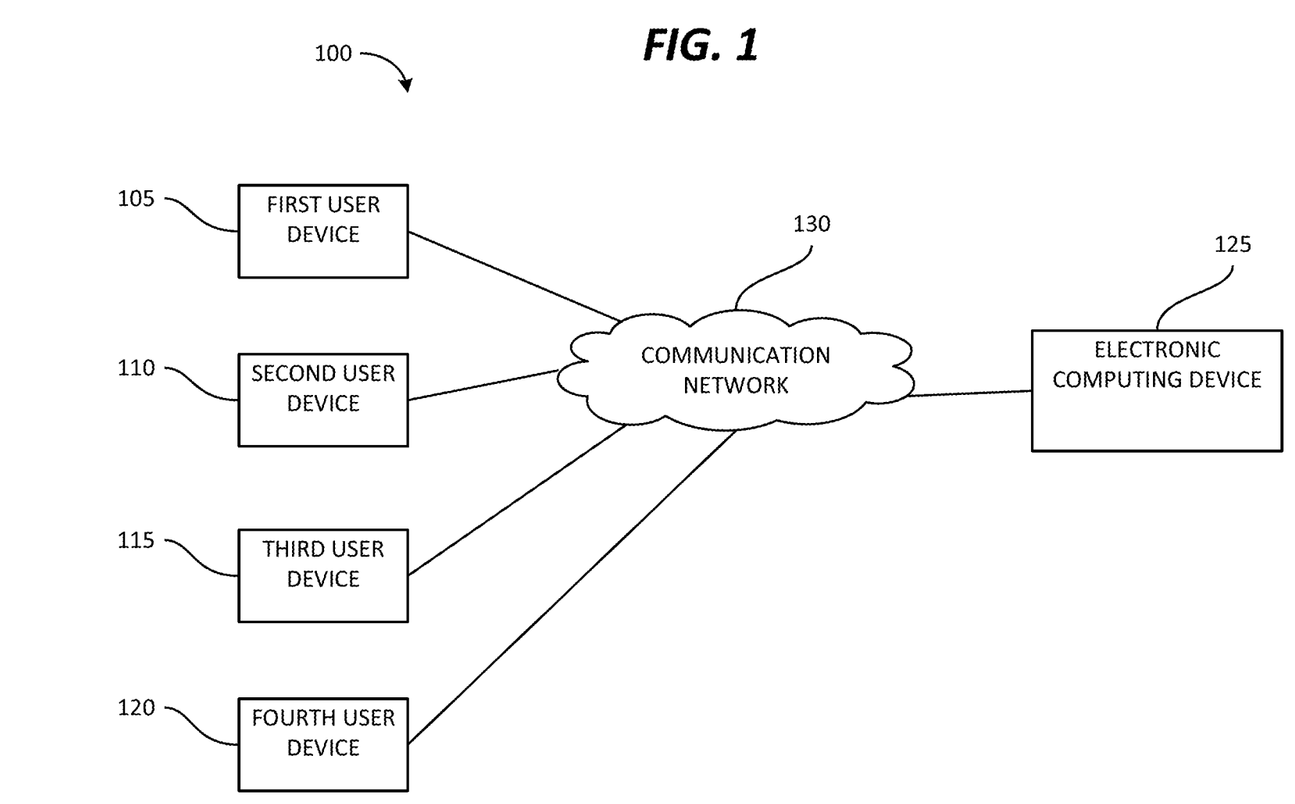
FIG. 1 is a block diagram of a system for utilizing behavioral data to authenticate a user entering login credentials in accordance with some embodiments.

FIG. 1 is a block diagram of a system 100 for utilizing behavioral features to authenticate a user entering login credentials. In the example shown, the system 100 includes a first user device 105, a second user device 110, a third user device 115, and a fourth user device 120 (referred to herein collectively as the user devices 105, 110, 115, 120) and an electronic computing device 125. The electronic computing device 125 and user devices 105, 110, 115, 120 are communicatively coupled via a communication network 130. The communication network 130 is an electronic communications network including wireless and wired connections. The communication network 130 may be implemented using a variety of one or more networks including, but not limited to, a wide area network, for example, the Internet; a local area network, for example, a Wi-Fi network; or a near-field network, for example, a Bluetooth™ network.

It should be understood that the system 100 may include a different number of user devices and that the four user devices 105, 110, 115, 120 included in FIG. 1 are purely for illustrative purposes. It should also be understood that the system 100 may include a different number of electronic computing devices than the number of electronic computing devices illustrated in FIG. 1 and the functionality described herein as being performed by the electronic computing device 125 may be performed by a plurality of electronic computing devices. It should be understood that some of the functionality described herein as being performed by the electronic computing device 125 may be performed by a user device. It should also be understood that some of the functionality described herein as being performed by a user device may be performed by the electronic computing device 125.

In the embodiment illustrated in FIG. 1, the electronic computing device 125 is, for example, a server that is configured to authenticate a user. In the embodiment illustrated in FIG. 1, the user devices 105, 110, 115, 120 are electronic computing devices (for example, a smart telephone, a laptop computer, a desktop computer, a smart wearable, a smart appliance, a smart home assistant, or other type of electronic computing device configured to operate as described herein).

Figure 2:
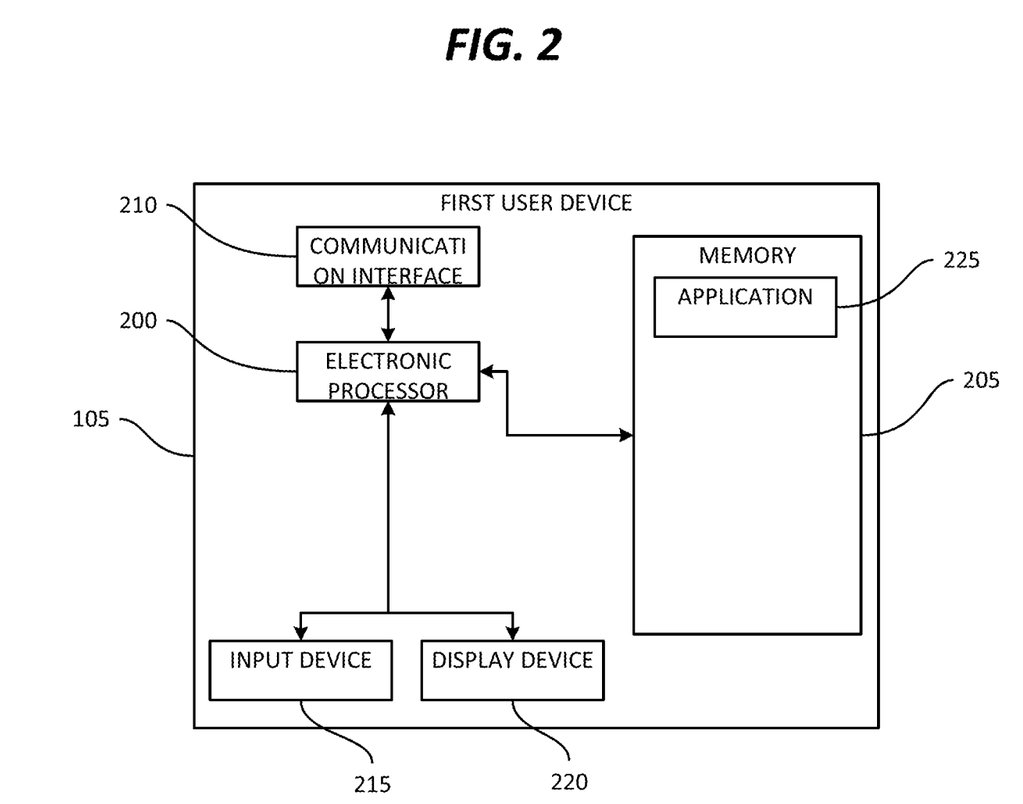
FIG. 2 is a block diagram of a user device of the system of FIG. 1 in accordance with some embodiments.

FIG. 2 is a block diagram of an example of the first user device 105. As illustrated in FIG. 2, the first user device 105 is an electronic computing device that includes an electronic processor 200 (for example, a microprocessor, application-specific integrated circuit (ASIC), or another suitable electronic device), a memory 205 (a non-transitory, computer-readable storage medium), and a communication interface 210, such as a transceiver, for communicating over the communication network(s) 130 and, optionally, over one or more additional communication networks or connections. The communication interface 210 allows the first user device 105 to communicate with the electronic computing device 125 over the communication network(s) 130.

The first user device 105 also includes an input device 215 and a display device 220. The display device 220 may include, for example, a touchscreen, a liquid crystal display ("LCD"), a light-emitting diode ("LED"), a LED display, an organic LED ("OLED") display, an electroluminescent display ("ELD"), and the like. The input device 215 may include, for example, a keypad, a mouse, a touchscreen (for example, as part of the display device 220, or the like (not shown). The electronic processor 200, the memory 205, the communication interface 210, the input device 215, and the display device 220 communicate wirelessly, over one or more communication lines or buses, or a combination thereof. It should be understood that the first user device 105 may include additional components than those illustrated in FIG. 2 in various configurations and may perform additional functionality than the functionality described herein. For example, in some embodiments, the first user device 105 includes multiple electronic processors, multiple memories, multiple communication interfaces, multiple input devices, multiple output devices, or a combination thereof. Also, it should be understood that, although not described or illustrated herein, the second user device 110, third user device 115, and fourth user device 120 may include similar components and perform similar functionality as the first user device 105.

As illustrated in FIG. 2, the memory 205 included in the first user device 105 includes an application 225. The application 225 is a software application that allows a user to access sensitive information (web content). For example, the application 225 may allow access to a user's bank account, credit card, healthcare information, or the like when a user enters login credentials into a login form and the user is authenticated. As described above, a user is authenticated by verifying that a user associated with the entered login credentials (or, for example, the user account 315 described below) is the user that entered the login credentials into the login form.

Figure 3:
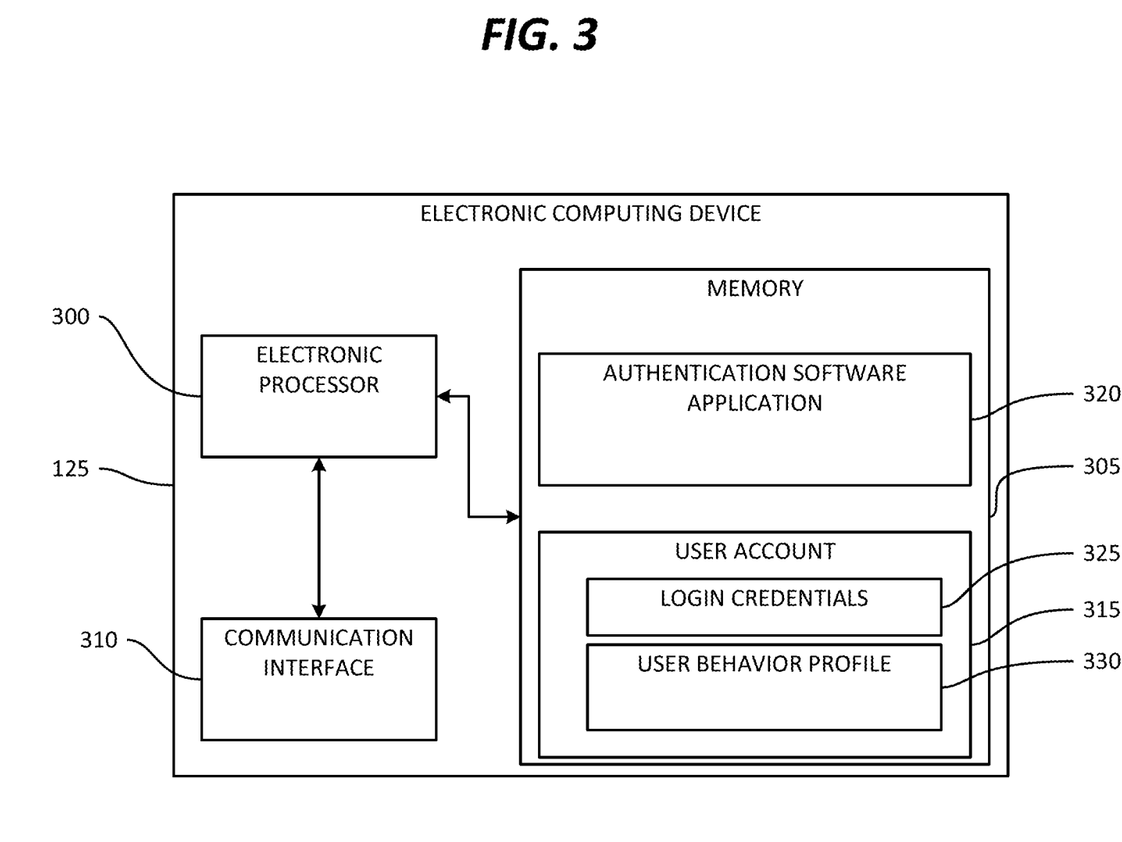
FIG. 3 is a block diagram of an electronic computing device of the system of FIG. 1 in accordance with some embodiments.

FIG. 3 is a block diagram of an example of the electronic computing device 125. As illustrated in FIG. 3, the electronic computing device 125 includes an electronic processor 300 (for example, a microprocessor, application-specific integrated circuit (ASIC), or another suitable electronic device), a memory 305 (a non-transitory, computer-readable storage medium), and a communication interface 310, such as a transceiver, for communicating over the communication network(s) 130 and, optionally, one or more additional communication networks or connections. The communication interface 310 allows the electronic computing device 125 to communicate with the user devices 105, 110, 115, 120 over the communication network(s) 130.

As illustrated in FIG. 3, the memory 305 included in the electronic computing device 125 includes a user account 315 and an authentication software application 320. The user account 315 is associated with one user and associated with login credentials 325. The login credentials 325 may be a username, a password, a pin number, an identification number, a combination of the foregoing, or the like. The user account 315 is also associated with a user behavior profile 330. The user behavior profile 330 includes data (behavioral features) relating to how the user account 315 is usually accessed. For example, the user behavior profile 330 may include, for a plurality of requests associated with the user account 315, a geolocation, an internet protocol (IP) address, a unique device identifier (UDID), a decentralized identifier (DID), a device fingerprint of one or more user devices that have accessed the user account 315, and the web browsers and user agents used to access the user account 315 associated with the request. The user behavior profile 330 may also include dates and times that requests to access the user account 315 are sent by a user device. In some embodiments, behavioral features received along with a request to access the user account 315 is used to update the user behavior profile 330 associated with the user account 315. It should be noted that the memory 305 may include a different number of user accounts and that the single user account 315 included in FIG. 3 are purely for illustrative purposes.

Figure 4:
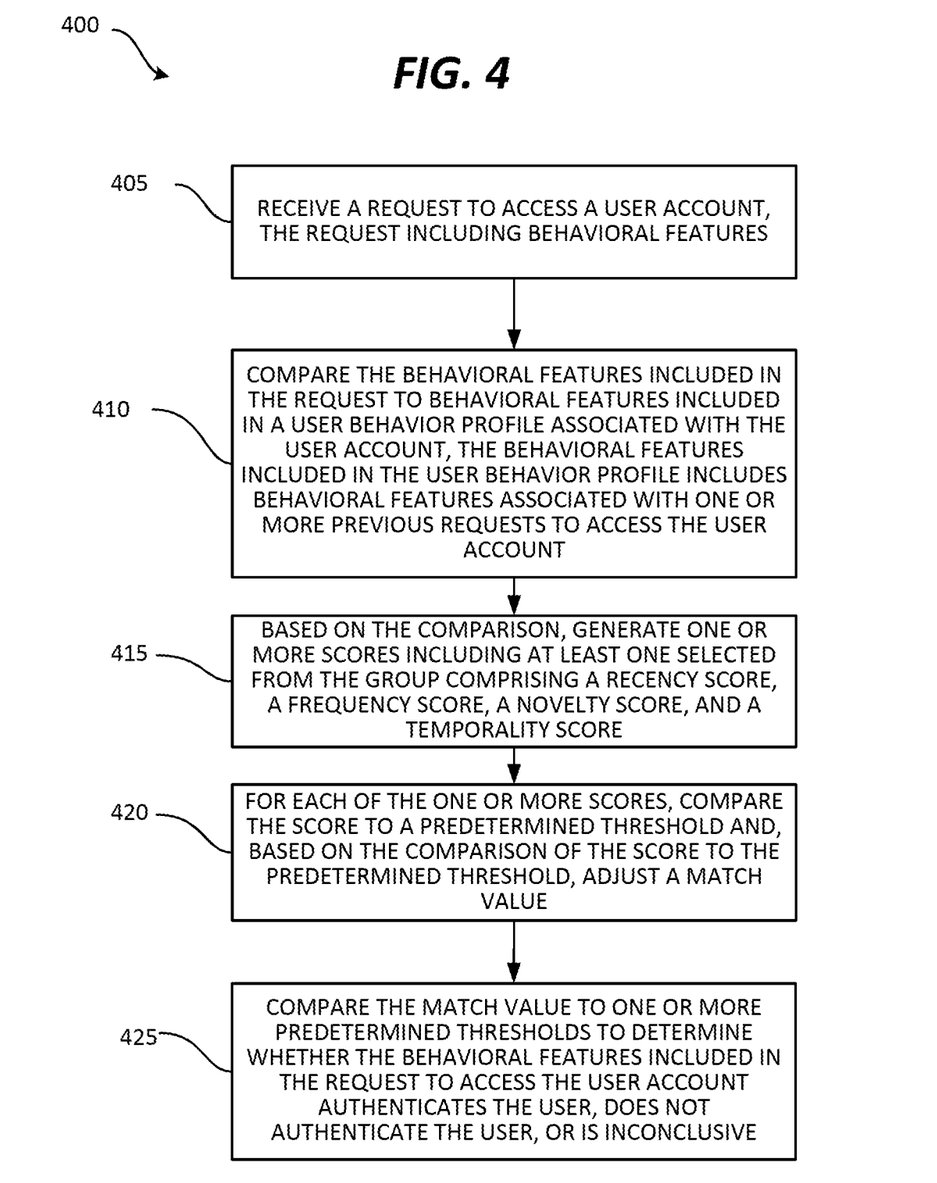
FIG. 4 is a flow chart of a method of utilizing behavioral features to authenticate a user entering login credentials in accordance with some embodiments.

FIG. 4 illustrates an example method 400 of utilizing behavioral features to authenticate a user entering login credentials. The method 400 is performed by the electronic processor 300, when the electronic processor 300 executes the authentication software application 320. At step 405, the electronic processor 300 receives, from a user device (for example, the first user device 105) a request to access a user account (for example, the user account 315). In some embodiments, the request includes login credentials, insufficient biometric data to authenticate the user, and behavioral features that may be used to authenticate the user. For example, the request may include the login credentials 325, a geolocation, an IP address of the first user device 105, a UDID of the first user device 105, a DID of the first user device 105, a device fingerprint of the first user device 105, or a combination of the foregoing. The request may also include a web browser, a user agent, or both via which the first user device 105 requested access to the user account 315. The request may also include a time stamp.

At step 410, the electronic processor 300 compares the behavioral features included in the request to behavioral features included in a user behavior profile associated with the user account. The user behavior profile (for example, the user behavior profile 330) includes behavioral features associated with one or more previous requests to access the user account (for example, the user account 315). At step 415, the electronic processor 300 generates one or more scores based the comparison between the behavioral features included in the request to behavioral features included in a user behavior profile. The one or more scores include at least one selected from the group comprising a recency score, a frequency score, a novelty score, and a temporality score. At step 420, for each of the one or more scores, the electronic processor 300 compares the score to a predetermined threshold and, based on the comparison of the score to the predetermined threshold, adjusts a match value. Examples of the one or more scores and how the match value is adjusted based on the one or more scores are described in detail below.

At step 425, the electronic processor 300 compares the match value to one or more predetermined thresholds to determine whether the behavioral features included in the request to access the user account authenticates the user, does not authenticate the user, or is inconclusive. For example, the electronic processor 300 compares the match value to a first predetermine threshold and a second predetermined threshold. In some embodiments, the second predetermined threshold is a lower value than the first predetermine threshold. In some embodiments, when the match value is greater than the first predetermine threshold, the electronic processor 300 authenticates the user (determines the user requesting access to the user account 315 is the user associated with the user account 315). In some embodiments, when the match value is less than the second predetermine threshold, the electronic processor 300 does not authenticate the user (determines the user requesting access to the user account 315 is not the user associated with the user account 315). In some embodiments, when the match value is less than the first predetermined threshold and is greater than the second predetermine threshold, the electronic processor 300 determines that it is inconclusive, based on the behavioral features included in the request, whether the user requesting access to the user account 315 is the user associated with the user account 315.

The following paragraphs include a description of example scores used to calculate the match value described in FIG. 4 and how the scores influence the match value. In some embodiments, before the frequency score, novelty score, recency score, first temporality score, and second temporality score are set to a predetermined value (for example, 0) before the electronic processor 300 analyzes the behavioral features associated with the request to determine the scores. In some embodiments, a frequency score of the one or more scores is generated based on frequent behavioral features included in the user behavior profile 330.

For example, the frequency score may be determined by comparing a geolocation (for example, the geographical state, city, or both that the first user device 105 was in when the first user device 105 sent the request) included in the request received from the first user device 105 to geolocations included in the user behavior profile 330. In some embodiments, if the geographical state (for example, Vermont) that the first user device 105 was in when the first user device 105 sent the request to the electronic processor 300 is, according to the behavioral features included in the user behavior profile 330, the geographical state that requests to access the user account 315 are frequently associated with, the value of the frequency score is increased by a value. The value may be a predetermined by a predetermined value and requests may be considered to be frequently associated with a geographical state, when the majority of requests to access the user account 315 are associated with the geographic state. In some embodiments, if the geographical city (for example, Boston) that the first user device 105 was in when the first user device 105 sent the request to the electronic processor 300 is, according to the behavioral features included in the user behavior profile 330, the geographical city that requests to access the user account 315 are frequently associated with, the value of the frequency score is increased by a value. The value may be a predetermined value and requests may be considered to be frequently associated with a geographical city, when the majority of requests to access the user account 315 are associated with the geographic city.

The frequency score may also be determined by comparing a DID or UDID included in the request (for example the DID or UDID of the first user device 105 that sent the request) to one or more DIDs, UDIDs, or both included in the user behavior profile 330. In some embodiments, if a DID or UDID of the first user device 105 is the DID or UDID of a user device that, according to the behavioral features included in the user behavior profile 330, frequently requests to access the user account 315, the frequency score is increased. The frequency score may be increased by a predetermined value and requests may be considered to be frequently associated with a DID or UDID, when the majority of requests to access the user account 315 are associated with the DID or UDID.

In some embodiments, when the frequency score is greater than the first predetermined threshold, the match value is increased by a predetermined value.

In some embodiments, the electronic processor 300 determines a novelty score based on, with respect to data included in the user behavior profile, a novelty of a behavioral feature associated with a request received from a user device. For example, the value of the novelty score may be determined by comparing the geographical state (for example, Wisconsin) included in the request received from the first user device 105 to the geolocations included in the user behavior profile 330 and comparing a DID or UDID included in the request received from the first user device 105 to the one or more DIDs, UDIDs, or both included in the user behavior profile 330. In some embodiments, if the geographical state that the first user device 105 was in when the first user device 105 sent the request to the electronic processor 300 is a geographical state that is not included in the user behavior profile 330, the value of the novelty score is increased (for example, by a predetermined value). In some embodiments, if a UDID or DID of the first user device 105 is the UDID or DID of a user device that is not included in the user behavior profile 330, the value of the novelty score is increased. In some embodiments, when the value of the novelty score is less than the second predetermined threshold, the match value is increased by a predetermined value.

In some embodiments, the electronic processor 300 determines a recency score. In some embodiments, the value of the recency score is determined by comparing the behavioral features received from the first user device 105 to the behavioral features included in the most previous or recent one or more requests (for example, the two most previous requests) to access the user account 315. The behavioral features included in the most previous one or more requests to access the user account 315 is included in the user behavior profile 330. In some embodiments, if the geographical state that the first user device 105 was in when the first user device 105 sent the request to the electronic processor 300 is a geographical state that was included in the most previous one or more requests to access the user account 315, the recency score is increased (for example, by a predetermined value). In some embodiments, if the geographical city that the first user device 105 was in when the first user device 105 sent the request to the electronic processor 300 is a geographical city that was included in the most previous one or more requests to access the user account 315, the recency score is increased (for example, by a predetermined value). In some embodiments, if the IP address of the first user device 105 is the IP address of the user device that sent the most previous one or more requests, the recency score is increased (for example, by a predetermined value). In some embodiments, if the UDID of the first user device 105 is the UDID of the user device that sent the most previous one or more requests, the recency score is increased by (for example, by a predetermined value). In some embodiments, if the DID of the first user device 105 is the DID of the user device that sent the most previous one or more requests, the recency score is increased (for example, by a predetermined value). In some embodiments, if the fingerprint of the first user device 105 is the fingerprint of the user device that sent the most previous one or more requests, the recency score is increased (for example, by a predetermined value). In some embodiments, if the user agent the request is received from is the user agent that sent the most previous one or more requests, the recency score is increased (for example, by a predetermined value). In some embodiments, if the browser the request is received from is the browser that sent the most previous one or more requests, the recency score is increased (for example, by a predetermined value). When the recency score is greater than the third predetermined threshold, the match value is increased by a predetermined value.

In some embodiments, the electronic processor 300 determines a first temporality score. The first temporality score is set to a predetermined value (for example, one) when the time and date associated with the request to access the user account 315 is similar to the date and time that the most previous one or more requests are associated with (for example, the times and dates the requests were sent at or received at). In some embodiments, a similar time is a time that is within a predetermined range. For example, if a time associated with a request is 3:00 PM coordinated universal time (UTC), a similar time may be between 1 PM UTC and 4 PM UTC. When the first temporality score is equal to the predetermined value (for example, one), the match value is increased by a predetermined value.

In some embodiments, the electronic processor 300 determines a second temporality score. The second temporality score is set to a predetermined value (for example, one) when the time elapsed between a time associated with the request to access the user account 315 (for example, the time the request is received by the electronic processor 300) and a time associated with the most previous request to access the user account 315 is within one standard deviation of the average time elapsed between the reception of previous consecutively received requests to access the user account 315. When the second temporality score is equal to the predetermined value (for example, one), the match value is increased by a predetermined value.

It should be understood that scores, other than the scores described herein, may be determined and influence the match value. For example, of velocity at which certain behavioral features are included in received requests may influence the match value. Behavioral features for which a velocity may be determined are, for example, DID, UDID, geographical location, an email domain, an internet service provider (ISP), an operating system version, a combination of the foregoing, and the like. A velocity of a behavioral feature may be the number of times an access request associated with a particular behavioral feature is received during a predetermined time period. In one embodiment, a velocity score may be set to a predetermined value when at least a predetermined number (for example, 10) of requests to access the user account 315 associated with the same DID are received during a predetermined time period (for example, five minutes). In some embodiments, when the velocity score is at least a predetermined value, the match value is decreased by a predetermined value.

It should also be understood that the behavioral features described above as being used to determine the scores need not necessarily be used to determine the scores. In some embodiments, behavioral features other than or in addition to those described in the examples provided above may be used to determine the scores. Additionally, it should be understood that thresholds, time periods, and values described above in relation to the calculation of one or more scores are illustrative examples and are not meant to be limiting.

In some embodiments, the predetermined thresholds that the frequency score, novelty score, recency score, match value or a combination of the foregoing are compared to are determined experimentally by adjusting the predetermined thresholds to achieve a desired authentication rate (percentage of users authenticated). In some embodiments, the predetermined thresholds that the frequency score, novelty score, recency score, match value or a combination of the foregoing are compared to are determined experimentally by adjusting the predetermined thresholds to achieve a desired false positive rate (percentage of users incorrectly authenticated).

In some embodiments, when the request to access the user account 315 is received in step 405 of the method 400, the electronic processor 300 may determine the reason that there is insufficient biometric data to authenticate the user. Depending on the reason for the insufficient amount of biometric data (for example, whether login credentials are entered with an autofill function or a copy and paste function, a hacker attempts to access the user account 315, or a user enters a small amount of data as login credentials), the electronic processor 300 varies the behavioral features analyzed to authenticate the user, varies the predetermined thresholds used in the method 400 to authenticate the user, or both.

It should be understood that other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used herein, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A system for utilizing behavioral features to authenticate a user entering login credentials, the system comprising:
    an electronic processor, the electronic processor configured to
        receive a request to access a user account, the request including biometric data associated with a user and behavioral features associated with a device, wherein the biometric data is captured by the device while the user interacts with the device by entering login credentials to access the user account, and wherein the login credentials include only non-biometric data;
        determine whether the biometric data is limited biometric data that without additional information is insufficient to authenticate the user entering the login credentials to access the user account;
        responsive to determining that the biometric data is the limited biometric data that without additional information is insufficient to authenticate the user entering the login credentials to the user account, compare the behavioral features included in the request to second behavioral features included in a user behavior profile associated with the user account, the second behavioral features included in the user behavior profile include third behavioral features associated with one or more previous requests to access the user account;
        based on the comparison, generate one or more scores including at least one selected from a group comprising a recency score, a frequency score, a novelty score, and a temporality score;
        for each of the one or more scores,
            compare a score to a predetermined threshold; and
            based on the comparison of the score to the predetermined threshold, adjust a match value; and
        compare the match value to one or more predetermined thresholds to determine whether the behavioral features included in the request to access the user account authenticates the user, does not authenticate the user, or is inconclusive.

2. The system according to claim 1, wherein the behavioral features include at least one selected from the group comprising a geolocation, an IP address, a UDID, a DID, a device fingerprint, a web browser, a user agent, an email domain, an ISP, an operating system version, and a time stamp.

3. The system according to claim 1, wherein the electronic processor is configured to determine a reason that there is the limited biometric data to authenticate the user; and
    depending on the reason for the limited biometric data to authenticate the user, determine which of the behavioral features to analyze to determine the one or more scores and determine the one or more predetermined thresholds to compare the one or more scores, the match value, or both to.

4. The system according to claim 1, wherein the electronic processor is configured to generate the frequency score based on whether one or more of the behavioral features included in the request are, based on the second behavioral features included in the user behavior profile, frequently associated with requests to access the user account.

5. The system according to claim 1, wherein the electronic processor is configured to generate the novelty score based on whether one or more of the behavioral features included in the request do not match a behavioral feature included in the user behavior profile.

6. The system according to claim 1, wherein the electronic processor is configured to generate the recency score based on whether one or more of the behavioral features included in the request match a behavioral feature included in the user behavior profile and associated with one or more most previous requests to access the user account.

7. The system according to claim 1, wherein the electronic processor is configured to generate a first temporality score based on whether a time and a date associated with the request is similar to a date and a time that one or more most previous requests are associated with.

8. The system according to claim 1, wherein the electronic processor is configured to generate a second temporality score based on whether time elapsed between a time associated with the request and a most previous request to access the user account is within one standard deviation of an average time elapsed between previously received consecutive requests to access the user account.

9. The system according to claim 1, wherein the electronic processor is configured to generate a velocity score based on whether at least a predetermined number of requests to access the user account associated with the same behavioral feature are received during a predetermined time period.

10. The system according to claim 1, wherein the electronic processor is further configured to determine that the biometric data is the limited biometric data that without additional information is insufficient to authenticate the user entering the login credentials to the user account by determining that the biometric data is based on one selected from a group consisting of:
    autofill input data,
    copy and paste input data,
    input data from a nefarious actor, and
    personal identification number (PIN) input data.

11. A method for utilizing behavioral features to authenticate a user entering login credentials, the method comprising:
    receiving a request to access a user account, the request including biometric data associated with a user and behavioral features associated with a device, wherein the biometric data is captured by the device while the user interacts with the device by entering login credentials to access the user account, and wherein the login credentials include only non-biometric data;
    determining whether the biometric data is limited biometric data that without additional information is insufficient to authenticate the user entering the login credentials to access the user account;
    responsive to determining that the biometric data is the limited biometric data that without additional information is insufficient to authenticate the user entering the login credentials to the user account, comparing the behavioral features included in the request to second behavioral features included in a user behavior profile associated with the user account, the second behavioral features included in the user behavior profile include third behavioral features associated with one or more previous requests to access the user account;
    based on the comparison, generating one or more scores including at least one selected from a group comprising a recency score, a frequency score, a novelty score, and a temporality score;

for each of the one or more scores,
comparing a score to a predetermined threshold; and
based on the comparison of the score to the predetermined threshold, adjusting a match value; and
comparing the match value to one or more predetermined thresholds to determine whether the behavioral features included in the request to access the user account authenticates the user, does not authenticate the user, or is inconclusive.

12. The method according to claim 11, wherein the behavioral features include at least one selected from the group comprising a geolocation, an IP address, a UDID, a DID, a device fingerprint, a web browser, a user agent, an email domain, an ISP, an operating system version, and a time stamp.

13. The method according to claim 11, the method further comprising generating the frequency score based on whether one or more of the behavioral features included in the request are, based on the second behavioral features included in the user behavior profile, frequently associated with requests to access the user account.

14. The method according to claim 11, the method further comprising generating the novelty score based on whether one or more of the behavioral features included in the request do not match a behavioral feature included in the user behavior profile.

15. The method according to claim 11, the method further comprising generating the recency score based on whether one or more of the behavioral features included in the request match a behavioral feature included in the user behavior profile and associated with one or more most previous requests to access the user account.

16. The method according to claim 11, the method further comprising generating a first temporality score based on whether a time and a date associated with the request is similar to a date and a time that one or more most previous requests are associated with.

17. The method according to claim 11, the method further comprising generating a second temporality score based on whether time elapsed between a time associated with the request and a most previous request to access the user account is within one standard deviation of an average time elapsed between previously received consecutive requests to access the user account.

18. The method according to claim 11, wherein determining that the biometric data is the limited biometric data that without additional information is insufficient to authenticate the user entering the login credentials to the user account by determining that the biometric data is based on one selected from a group consisting of:
autofill input data,
copy and paste input data,
input data from a nefarious actor, and
personal identification number (PIN) input data.

19. A non-transitory computer-readable medium with computer-executable instructions stored thereon that are executed by an electronic processor to perform a set of operations comprising:
receiving a request to access a user account, the request including biometric data associated with a user and behavioral features associated with a device, wherein the biometric data is captured by the device while the user interacts with the device by entering login credentials to access the user account, and wherein the login credentials include only non-biometric data;
determining whether the biometric data is limited biometric data that without additional information is insufficient to authenticate the user entering the login credentials to access the user account;
responsive to determining that the biometric data is the limited biometric data that without additional information is insufficient to authenticate the user entering the login credentials to the user account, comparing the behavioral features included in the request to second behavioral features included in a user behavior profile associated with the user account, the second behavioral features included in the user behavior profile include third behavioral features associated with one or more previous requests to access the user account;
based on the comparison, generating one or more scores including at least one selected from a group comprising a recency score, a frequency score, a novelty score, and a temporality score;
for each of the one or more scores,
comparing a score to a predetermined threshold; and
based on the comparison of the score to the predetermined threshold, adjusting a match value; and
comparing the match value to one or more predetermined thresholds to determine whether the behavioral features included in the request to access the user account authenticates the user, does not authenticate the user, or is inconclusive.

20. The non-transitory computer-readable medium according to claim 19, wherein the behavioral features include at least one selected from the group comprising a geolocation, an IP address, a UDID, a DID, a device fingerprint, a web browser, a user agent, an email domain, an ISP, an operating system version, and a time stamp.

* * * * *